United States Patent [19]

Savkar et al.

[11] Patent Number: 5,047,612

[45] Date of Patent: Sep. 10, 1991

[54] APPARATUS AND METHOD FOR CONTROLLING POWDER DEPOSITION IN A PLASMA SPRAY PROCESS

[75] Inventors: Sudhir D. Savkar; Robert D. Lillquist, both of Schenectady, N.Y.

[73] Assignee: General Electric Company, Schenectady, N.Y.

[21] Appl. No.: 475,471

[22] Filed: Feb. 5, 1990

[51] Int. Cl.[5] .......... B23K 9/00

[52] U.S. Cl. .......... 219/121.47; 219/121.55; 219/121.51; 219/76.16; 219/121.59; 427/34

[58] Field of Search .......... 219/121.48, 121.47, 219/121.59, 121.55, 121.54, 76.15, 76.16; 427/34

[56] References Cited

U.S. PATENT DOCUMENTS 4,656,331 4/1987 Lillquist et al. .......... 219/121.47

4,687,344 8/1987 Lillquist .......... 219/121.47

4,901,921 2/1990 Dallaire et al. .......... 219/121.47

*Primary Examiner*—Mark H. Paschall

*Attorney, Agent, or Firm*—James R. McDaniel; James C. Davis, Jr.; Paul R. Webb, II

[57] ABSTRACT

An apparatus and method for controlling the powder deposition and deposit pattern in a plasma spray process are provided in which an infrared imaging detector and associated processors are employed to provide an image of the temperature distribution of the deposit and to provide an identification of the impact point of the most recent powder deposit, and in which a cyclone separator or other device is used to modulate the flow rate of the carrier gas in which the powder is entrained at the point where the powder and gas are injected into a plasma plume, in order to move the impact point of the powder from the sensed location to a desired location. An injector tube is provided in a cross-flow injection system which may be sized to compensate for variations in the desired injection velocities of particles of different sizes, and the variations in the rate at which such particles are accelerated in the injection tube. A control computer is optionally provided to permit on-line control of the carrier gas flow rate by receiving the sensed image and comparing the information in the image to a reference pattern, and adjusting the carrier gas flow rate at the injector tube accordingly.

30 Claims, 4 Drawing Sheets

APPARATUS AND METHOD FOR CONTROLLING POWDER DEPOSITION IN A PLASMA SPRAY PROCESS

BACKGROUND OF THE INVENTION

1. Field of the Invention

The present invention relates to an apparatus and method for controlling the deposition of a powder in a plasma spray process, and particularly to an apparatus and method in which the location and pattern of powder deposition is monitored and controlled.

2. Description of Related Art

Heretofore, problems have existed in powder deposition plasma spray processes in that it is very difficult to control the precise location of the powder deposit. Processes employing low pressure dc-arc plasma spray guns generally incorporate a cross-flow powder injection scheme which, along with variations in powder size and flow swirl, contributes to the inconsistencies in depositing the powder in a desired location. In a device employing cross-flow powder injection, the powder is delivered to the plasma gun by a carrier gas which serves two purposes. In conveying the powder from the powder feeders to the gun, the gas must flow at a high enough rate to ensure that the powder does not settle and plug the powder lines. In addition, once the gas reaches the powder injector, the gas is required to accelerate the powder preferably to a desired speed at which the powder will penetrate the plasma jet to its central hot region and then be melted and deposited on the target. If the gas flow rate at the injector is too high, the powder will completely traverse the plasma jet and will not be completely melted, and if the gas flow rate is too low, the powder will not penetrate into the hot core of the jet. Difficulties previously encountered with cross-flow powder injection are believed to be attributable to a mismatch between the carrier gas flow rate required to ensure a free flow of powder through the lines and the gas flow rate required to properly inject the powder into the plasma jet.

A further problem has existed with the cross-flow powder injection devices previously employed. Erosion of the feed port causes variations in the injection speed and trajectory of the powder. The solution presently employed to correct this problem is to change the guns after approximately 100 hours of running time. The new gun must then be adjusted to ensure that the spray pattern falls within certain limitations before continuing with the process. Prior to the present invention, no system or device was believed to exist which provided a means for automatic on-line compensation of the spray pattern, which would reduce the amount of adjustment necessary to obtain the desired spray pattern.

In devices and processes employing an RF plasma spray gun, an axial powder feed is employed, which avoids several of the above-noted problems associated with the cross-flow feeding of the powder. However, problems in controlling the deposit location or pattern exist in systems employing RF guns, in that RF gun deposits "wander" on the target due to complex flow patterns within the guns. The location of the deposit on the target in such systems is dependent upon the degree of injector insertion into the gun and plasma. Prior to the present invention, no system or device was believed to exist which was used to monitor the deposit to locate the impact point of the powder on the target, and to use the information obtained in a feedback loop to modulate the injector insertion.

U.S. Pat. No. 4,656,331, issued to Lillquist et al, and assigned to General Electric Company, discloses an infrared sensor suitable for use in detecting temperatures of particles entrained in a plasma spray jet in order to control the electrical power input to the plasma torch to ensure that the particles are heated to a molten temperature prior to their impact on a target substrate. The infrared sensor disclosed in that patent is discussed as having, alternatively, a single detector, a linear array of detectors to measure a temperature profile or beam divergence, or a rectangular array of detectors capable of performing an imaging function.

It is a primary object of the present invention to provide an apparatus for detecting and monitoring the deposition of the powder on the target, and providing means for using information obtained to selectively adjust, as necessary, one or more parameters in order to control the deposition of the powder on the target.

It is an additional object of the present invention to provide an apparatus having an infrared imaging radiometer integrated with a video signal processor for providing information related to the sensed location of the deposit of the powder onto the target.

It is an additional object of the present invention to provide an apparatus which provides improved and more accurate delivery of the powder into the plasma jet by compensating for variations in powder size and/or by adjusting the carrier gas flow rate in the powder injector.

It is an additional object of the present invention to provide a method for controlling the deposition of a powder on a target using a plasma spray process wherein a pattern of powder deposition on the target is monitored by an infrared imaging radiometer to determine the impact point of the powder, a display of the imaged pattern is produced, and one or more parameters, including the carrier gas flow rate, are adjusted as necessary to more the powder impact point to yield the desired deposition pattern.

It is a further object of the present invention to provide an apparatus having means for controlling the flow rate of the carrier gas in the powder injector such that an optimal flow rate may be achieved in both the powder supply lines and in the powder injector tube.

Summary of the Invention

The above and other objects of the present invention are accomplished by providing an apparatus having means for sensing the impact point of a powder entrained in a plasma spray upon a workpiece or target, and for providing information with respect to the sensed impact point which can be used to either manually or automatically make adjustments in either the apparatus or the processing parameters, as necessary, in order to make the sensed impact point coincide with a desired impact point. A sensor comprising an infrared imaging radiometer configured to be capable of sensing infrared radiation longer than three (3) micrometers, and means capable of generating and processing a video signal to be displayed on a video monitor is especially well suited for use with the dc-arc and RF plasma spray processes to which the present invention is directed. Information obtained from the imaging radiometer, either in the form of a video signal or in another form may be employed to make on-line corrections, where necessary, in the powder deposition pattern.

Also forming a part of the present invention, particularly for use in an apparatus in which a cross-flow powder injection scheme is used, is an injector means which compensates for variations in powder velocity due to variations in powder velocity due to variations in powder particle size, and additionally permits the carrier gas flow rate within the injector means to be varied without substantially affecting the carrier gas flow rate in the powder feed lines. A cyclone-type separator having a carrier gas bypass line is employed to affect this latter function wherein a portion of the carrier gas may be bypassed or separated from the powder delivery stream and diverted away from the injector tube. The amount of carrier gas drawn off in the bypass can be regulated to control the gas flow rate at the injector tube, thus permitting control of the velocity at which the powder is injected into the plasma plume.

The present invention also includes a method for controlling the deposition of a powder on a workpiece or target in a plasma spray process. The method includes sensing the impact point of the powder spray on the target, comparing the impact point to a predetermined desired impact point, and adjusting a carrier gas flow rate as necessary to make the sensed impact point coincide with the location of the predetermined desired impact point. This may be achieved in an apparatus employing the cyclone separator by adjusting the amount of carrier gas diverted from the injector by way of the bypass line.

Brief Description of the Drawings

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views.

Detailed Description of the Invention

Figure 1:
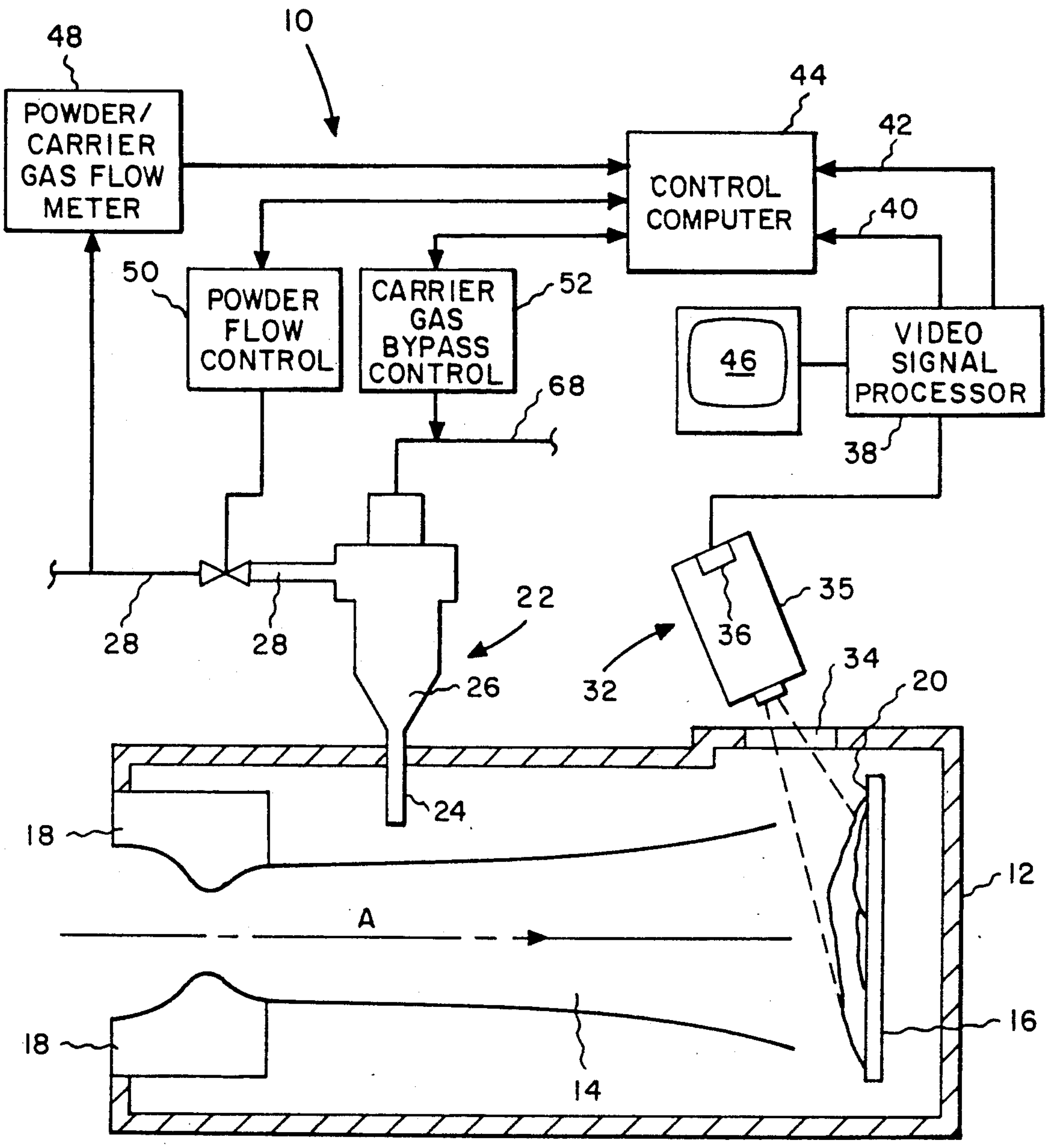
FIG. 1 is a diagrammatic representation of the apparatus for controlling powder deposition in a plasma spray process according to a preferred embodiment of the present invention.

Referring initially to FIG. 1, the apparatus 10 for controlling the powder deposition in a plasma spray process is shown in a substantially diagrammatic or schematic form. The apparatus 10 as depicted is preferably a low pressure dc-arc plasma spray gun system known generally in the art. Although the following discussion of this Figure is primarily directed to a dc-arc system, it will be recognized by those skilled in the art that the present invention would be capable of being used in a system employing an RF plasma spray gun as well.

Apparatus 10 comprises a vacuum chamber 12, which encloses the region in which a plasma plume 14 is formed and the target or workpiece 16 is disposed, in a manner well known in the art. In order to protect the chamber 12 from the heat generated in the plasma spray process, the vacuum chamber may be provided with a cooling jacket (not shown) or other means for cooling the chamber.

A plasma gun anode 18 of a type generally known in the art is also depicted in substantially schematic form facing in the direction of a deposit surface 20 on target or workpiece 16. The representation of the plasma plume 14 is shown to extend in an axial direction (axis A, FIG. 1) between the exit of the plasma gun anode 18 and target 16, and the plume may therefore be described as having an axial extent along axis A.

A powder injection means 22, comprising injector tube 24 and cyclone separator 26, the details of which will be discussed at a later point in the specification, is disposed at a predetermined desired axial location between the plasma spray anode 18 and target 16. The powder injector means 22 is spaced apart in a radial sense from the plasma plume region, and injector tube 24 is preferably disposed to direct a powder to be deposited on the target 16 into the plasma plume or jet 14, at an angle substantially normal to axial direction A of the plasma jet. This manner of introducing the powder into the plasma jet is termed cross-flow injection, and is usually employed in dc-arc plasma spray gun devices. The powder to be deposited is entrained in a carrier gas, which transports the powder through a powder feed line 28 into the cyclone separator 26 of the present invention.

The powder injected into the plasma jet may be of any type known to be suitable for use in plasma spray deposition processes, including both metallic and ceramic powders. The powder is brought to a molten state by the plasma jet 14 and impinges onto and adheres to target 16, thus forming deposit 20 on the target surface 16.

A sensor means 32 is provided in the apparatus, the sensor means normally being placed external to vacuum chamber 12, and being positioned to view the entire deposit surface 20 of target 16 through a window 34 provided on a wall of the vacuum chamber. The material for window 34 is selected so as to allow radiation in a wavelength range of interest to pass through to the sensor means. In this preferred embodiment, the radiation wavelengths of primary interest are those longer than three (3) micrometers, Where the radiation emitted by inert gas and inert gas-hydrogen gas mixture plasmas is much less intense than the radiation emitted by hot (>400° C.) metallic and ceramic plasma-sprayed deposits. An example of a candidate window material is arsenic trisulfide.

The sensor means 32 in the preferred embodiment of the present invention is an imaging infrared radiometer 35 substantially of the type disclosed in U.S. Pat. No. 4,656,331, assigned to General Electric Company, the subject matter of which is hereby incorporated by reference. The radiometer 35 preferably employs a rectangular array of cryogenically cooled mid-infrared photon detectors, shown schematically at 36, such as indium antimonide or mercurycadmium telluride, and is filtered in a manner known in the art to respond to infrared radiation wavelengths longer than approximately three (3) micrometers. By way of example, commercially available infrared imaging detectors suitable for use in the present invention include the AGEMA Infrared Systems Model 870 SW Thermovision and the Model 880 LW Thermovision, fitted with appropriate filters to screen out infrared wavelengths smaller than approximately three (3) micrometers.

The output signal from the radiometer 35 is in the form of a composite video signal, such as the standard EIA RS-170 composite signal (525 line, 60 Hz, 2/1 interlace) although a radiometer 35 could be selected, where desired, to have an output based on the European signal standard, or any other composite signal compatible with downstream equipment. The radiometer video signal is output, in the depicted preferred embodiment, to a video signal processor 38, which comprises a circuit or circuits used to analyze the video signal output and to generate a processed output containing information with respect to the location of the most intense point in the video image and with respect to the measured intensity, these two components of the processed output signal being represented by outputs 40, 42, respectively. This information corresponds to the position or location on the deposit 30 with the most intense radiation, which is indicative of the hottest region, and thus of the impact point of the powder being deposited on the workpiece 16. The outputs 40, 42 of the video signal processor are sent to a control computer 44.

In a preferred embodiment, the video signal processor 38 may comprise a digital frame grabber, for example, a PC Vision card and software marketed by Imaging Technology, Inc., for IBM PC-Class computers. The PC Vision card will preferably be installed in the control computer 44. In an alternative preferred embodiment, an analog video analyzer, such as the Colorado Video Model 321 Video Analyzer, may be employed to extract the desired information, and output the information in the form of D.C. voltages proportional to the location and sensed intensity. A monitoring system employing this analog video analyzer is described in U.S. Pat. No. 4,687,344, assigned to General Electric Company, the subject matter of which is hereby incorporated by reference. The video signal processor may also preferably provide an output signal for a video monitor 46 which can be employed to display a map of the temperature distribution detected on the deposit surface of workpiece 16 and/or a plot of the detected intensities, correlatable to actual temperatures, or a slice of the deposit taken along a section line of the temperature distribution map.

The computer 44 is preferably configured to compare the information output from the video signal processor to a predetermined basic reference pattern or patterns to determine whether there is any deviation larger than a given amount. If such a deviation exists, the computer 44 is used to send control signals to adjust processing parameters in order to bring the sensed deposit pattern back within the limits set in the basic reference pattern.

As depicted in FIG. 1, a preferred control scheme has the computer 44 operatively coupled to a powder mass flow meter 48, a powder flow control means 50 and a carrier gas bypass control means 52. The method of control in this embodiment involves regulating or controlling, via control signals sent by computer 44, the feed rate of the powder and carrier gas and the amount of carrier gas bypassed prior to entry of the powder into injector tube 24. By way of example, a non-intrusive flow measurement device capable of measuring two phase flow, such as the Micromotion flow measurement device, may be employed to take actual measurements of the powder and gas flows in the feed system, and that information may be input into computer 44 for use in controlling the feed rates of the powder and carrier gas. The powder flow control means 50 and carrier gas bypass control means 52 may preferably comprise control values which are configured to be operated by the control signals from computer 44 to increase or decrease the powder and carrier gas flow rates and/or the amount of carrier gas bypassed at the powder injector means 22.

Figure 2:
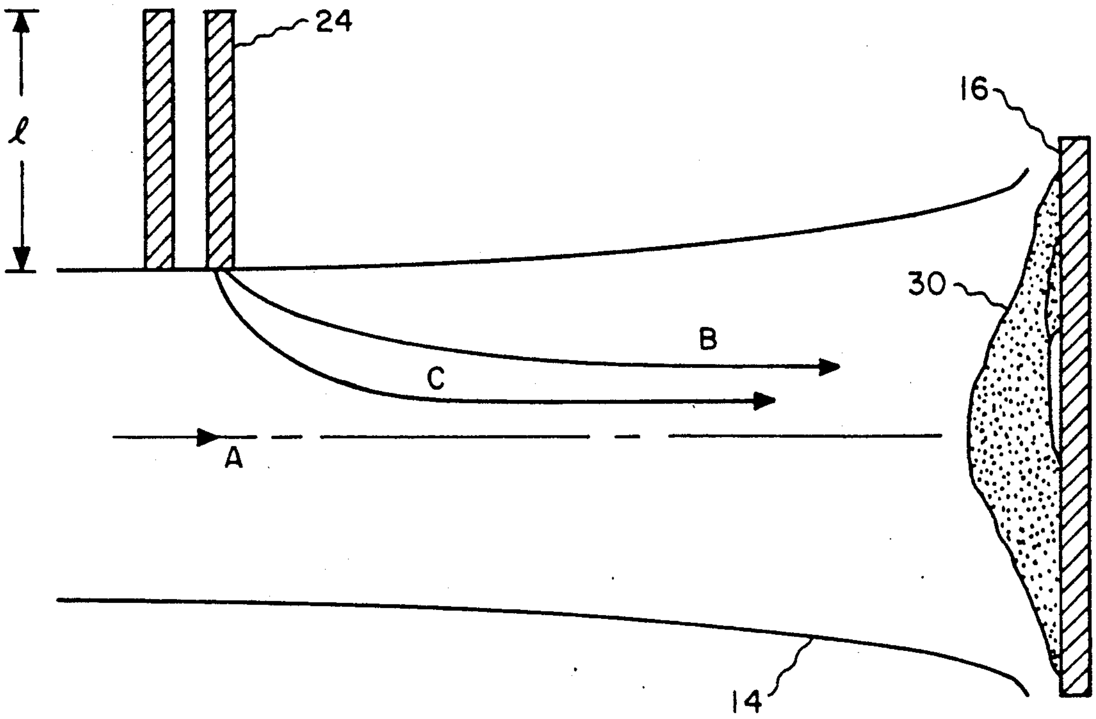
FIG. 2 is a diagrammatic representation of the plasma plume region apparatus of FIG. 1.
Figure 3:
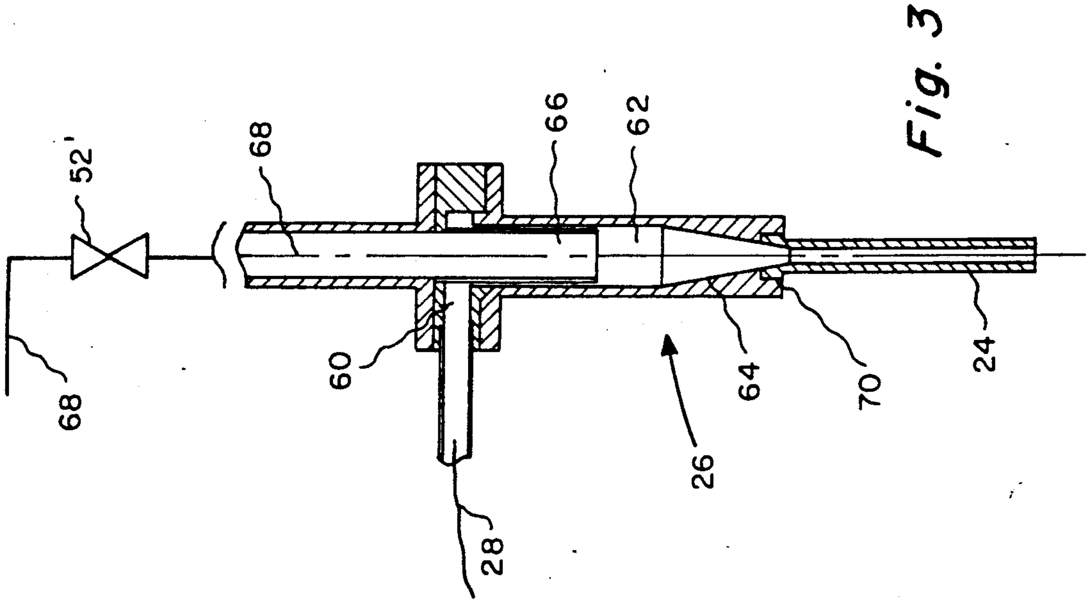
FIG. 3 a cross-sectional view of a cyclone separator according to a preferred embodiment of the present invention.

Referring now to FIGS. 2 and 3 in conjunction with FIG. 1, the design and function of the powder injector means 22 will be described in detail. As indicated earlier in the specification, the velocity of the powder entering the plasma plume or jet will have an effect on the powder deposition pattern. More specifically, the trajectory of the powder in plasma plume 14, and thus the location or impact point of the powder on target 16, is a strong function of the carrier gas flow rate at the injector tube. Arrows B and C in FIG. 2 are representative of powder trajectories in plasma plume 14. It is generally desirable to have the powder particles traveling at a velocity wherein the particles penetrate to the center of the plume without traversing completely therethrough. The powder particles, however, may have a broad size distribution, and particles of different sizes have different desired injection velocities for a given plasma velocity. In addition, the different sized particles will be accelerated at different rates by the carrier gas to the desired velocities.

The powder injector means 22 of the present invention provides a means for compensating for the variation in the velocity of a powder of a broad size distribution. In a cross-flow injection system, the particles are radially introduced into the plasma plume 14, as shown in FIGS. 1 and 2. In a model of this system, the particles are accelerated from rest through injector tube 24 into the plasma plume by a carrier gas having a velocity $U_g$. The dynamics of the powder particle in this model are governed by the following:

$$\frac{dU_p}{dt} = \frac{U_g - U_p}{\tau_{gi}} \quad (1)$$

and $$\frac{dr}{dt} = U_p \quad (2)$$

where $U_p$ is the particle speed and $\sigma_{gi}$ is the governing time scale:

$$\tau_{gi} = \frac{\rho_p d_i^2}{18\mu_g} \quad (3)$$

The variables $\mu_g$ and $d_i$ are, respectively, the viscosity of the carrier gas and the particle diameter, solving the above set for an injector tube of length 1. there obtains a solution set involving the logarithmic function $$\frac{t}{\tau_{gi}} = -\ln\left(1 - \frac{U_p}{U_g}\right) \quad (4)$$

-continued and $$\frac{1}{U_g \tau_{gi}} = \frac{t}{\tau_{gi}} - \frac{U_p}{U_g} \quad (5)$$

For a given value of $U_g$ and given particle and gas characteristics (cold gas), one can solve for the relationship between the length of the injector tube 1 and the particle velocity $U_p$. In a specific example wherein the plasma velocity is $W_o$ and the carrier gas velocity is 42 m/sec, one may determine the duct or injector tube length required to bring different particle sizes within a particular size distribution to approximately the same speed, an example of which is provided in Table I below, wherein Column A represents the particle diameter $d_i$ in micrometers (μm), Column B identifies the injection velocity $U_p$ (in meters per second) required in order for the particle to impact a substrate or target centrally for a given plasma velocity $W_o$, and Column C displays the length 1 (in centimeters) of the injector tube required to accelerate the particle to $U_p$ from rest.

TABLE I

| A | B | C |
|---|---|---|
| 4 μm | 40 m/sec | 3.4 cm |
| 44 μm | 8 m/sec | 3.3 cm |
| 13.4 μm | 20 m/sec | 2.6 cm |

An injector tube length slightly longer than three (3) centimeters, for example 3.1 cm or 3.2 cm, will accelerate the majority of the particles to approximately the correct injection velocity into the plasma plume 14 to ensure that all of the particles reach the target substrate near the center of the target.

Because the desired length of the injector tube 24 depends to some extent on the carrier gas velocity $U_g$, it is possible to select an injector tube of a particular length, and to make any further adjustments necessary to vary the injection velocity and deposit the particles in a desired location by adjusting the carrier gas velocity in the injector tube. However, as indicated previously, the carrier gas velocity in the powder feed line 28 must be maintained at or above a minimum level in order to ensure that the powder will move freely through the line and not clog the line, and therefore reduction of the velocity in the powder feed line below a certain amount will result in such clogging.

The mismatch between the required carrier gas feed rate or velocity required in the feed line to prevent clogging, and the carrier gas feed rate required to inject the powder particles at a desired velocity into the plasma plume is accommodated for in the powder injector means 22 of the present invention, which provides means for bypassing a portion of the carrier gas used to transport the powder prior to the carrier gas and powder reaching the injector tube 24. In providing a carrier gas bypass means, the apparatus of the present invention does not require control of the carrier gas velocity in the powder feed line 28 in order to obtain an adjustment in the carrier gas velocity in the injector tube 24. In the depicted preferred embodiment, the cyclone separator 26, together with bypass control 52, serve as the carrier gas bypass means.

Referring especially now to FIG. 3, a preferred embodiment of the cyclone separator 26 of the present invention is depicted in cross-section. Cyclone separator 26 comprises an inlet port 60, an upper cylinder 62, a lower frustoconical section 64, and a carrier gas bypass outlet tube 66 disposed centrally within the upper cylinder 62 and extending axially upwardly out of the cyclone separator. Carrier gas bypass outlet tube 66 is preferably coupled to a carrier gas bypass control valve 52′ and a bypass gas outlet line 68. Disposed at a lower end of the lower frustoconical section 64 is injector tube 24, which is depicted as being connected to cyclone separator 26 by way of a threaded connection 70.

In operation, the powder to be deposited on the substrate and the carrier gas in which the powder is entrained or suspended enter the cyclone separator from powder feed line 28 at inlet port 60. Inlet port 60 may direct the carrier gas and powder tangentially with respect to upper cylinder 62, as is done in many cyclone separators previously employed for separating particles from a gas stream. Optionally, it may be possible to have the inlet port 60 direct the carrier gas and powder radially into the separator 26, as complete separation of the powder from the gas is not generally desired. The powder and carrier gas move downwardly as powder and carrier gas are continuously introduced through inlet port 60.

If no gas bypass line were provided, as in prior art cross-flow powder injectors, or if the carrier gas bypass valve 52′ were completely closed in the depicted preferred embodiment, all of the carrier gas would be sent with the powder through injector tube 24, which, because the carrier gas velocity is relatively high in the powder feed line to prevent clogging, generally results in high particle injection velocities. Under such conditions, many, if not all, of the particles may traverse completely through the plasma plume 14, and either miss the target 16 completely or strike the target at a location lower than that desired.

The carrier gas bypass control valve 52′ in the preferred embodiment is preferably adjustable to positions ranging from fully open to fully closed. A gradual opening (or closing) of the carrier gas bypass control valve 52′ may be employed to increase (or decrease) the desired portion of the carrier gas to be bypassed upwardly through carrier gas bypass outlet tube 66 and bypass gas outlet line 68 while the powder and a remaining portion of the carrier gas drop downwardly to enter injector tube 24, which thereby modulates the particle injection velocities to a desired level and achieves a desired deposit pattern on the target 16. Through the use of the sensor means 32 (FIG. 1) which is in communication with control computer 44, which may in turn be employed to control the carrier gas bypass control means 52 (carrier gas bypass valve 52′), the location of the impact point of the powder on the target 16 may be detected and adjusted or controlled as necessary. As indicated previously, the control computer 44 may preferably be provided with a predetermined basic reference pattern or patterns to which the sensed impact point can be compared in order to determine whether any adjustment in the amount of carrier bas being bypassed at cyclone separator 26 is necessary.

In an experiment conducted in connection with the development of the present invention, tests using a plasma gun anode, cyclone separator, injector tube, and target, substantially as schematically illustrated in FIG. 1, were conducted to determine the effect of the amount of carrier gas bypassed on e resulting deposit pattern of the powder injected. An injector tube having a length of 3.1 cm was employed to provide particles velocity compensation, as discussed previously. The powder was fed perpendicularly to the plasma jet at a point 1.1 cm axially downstream of the anode exit and 1.7 cm from central axis A of the plasma jet 14. In this series of tests, a Rene-80 powder was deposited at a rate of 170 gm/sec., on a target which was located at a distance of 38 cm from the anode exit. A carrier gas flow of 6.0 scfh was employed upstream of the cyclone separator to transport the powder to the cyclone separator. The target employed was a substrate presenting a 15 cm × 15 cm deposit surface.

Figure 4:
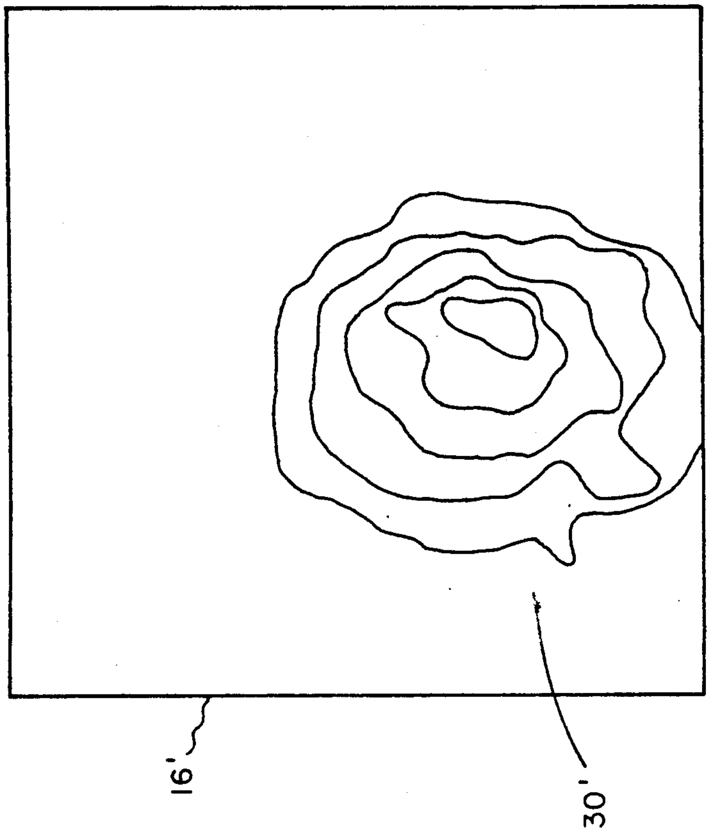
FIG. 4 a thickness contour plot of the powder deposited on a target in an experiment conducted in accordance with the present under a 30% carrier gas bypass condition.
Figure 5:
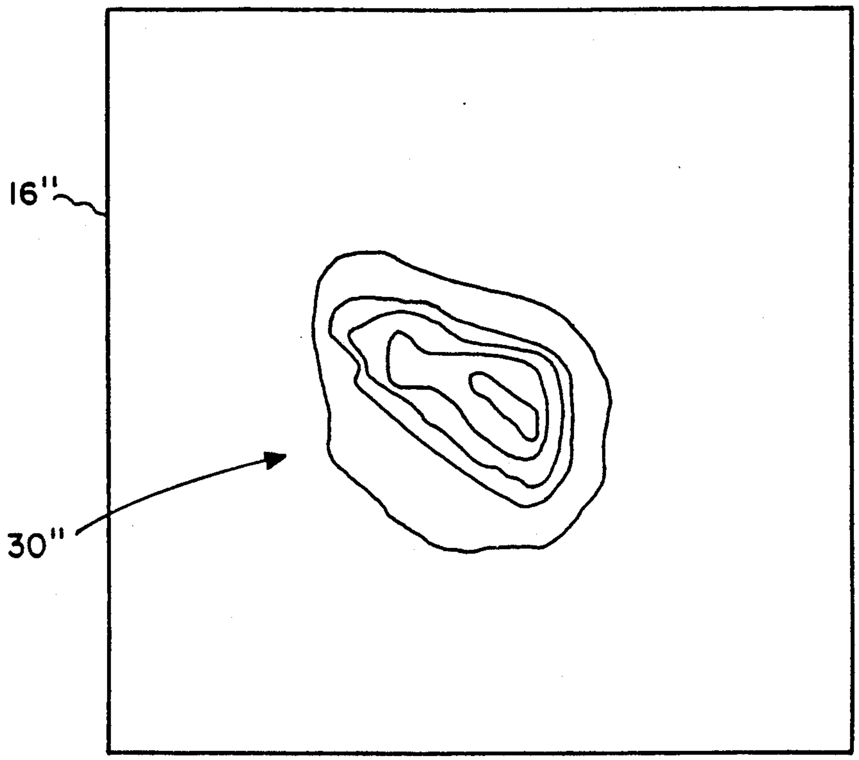
FIG. 5 is a thickness contour plot of the powder deposited on a target in an experiment conducted in accordance with the present invention under an 80% carrier gas bypass condition.

In a test in which no carrier gas was bypassed upwardly out of the cyclone separator, a large portion of the powder spray completely missed the substrate, passing by the substrate at the bottom thereof. FIGS. 4 and 5 depict thickness contour plots of the powder deposits realized in tests conducted with the above-described apparatus, at conditions of approximately a 30% carrier gas bypass (FIG. 4) and of approximately an 80% carrier gas bypass (FIG. 5). It can be seen that in these Figures that the deposit 30; in FIG. 4 is slightly low of center on target 16', indicating that the velocity of the particles entering the plasma plume from the upper side was somewhat higher than desired, and the majority of the particles, while not completely traversing through the plasma plume, did traverse past a central axial region of the plume. The deposit 30'' in FIG. 5 is more centrally disposed on the target 16'', indicating that the velocity of the particles was such that a majority of the particles entered the plasma plume and were projected substantially along the central axis of the plume.

In addition, a somewhat "tighter" distribution of deposited powder is realized in the FIG. 5 contour plot, which is indicative that the pattern can be more tightly controlled if the particles enter the plasma plume at a velocity wherein the particles traverse substantially only to the center of the plume.

It will be recognized that the actual desired percentage of bypassed gas will depend upon a number of factors, including the particular apparatus and arrangement of components actually employed. Even without employing the sensing means 32 of the present invention, preferred settings of a bypass gas control valve 52' may be determined in a particular apparatus, much in the same manner as the approach used in the above tests. However, the use of the sensing means of the present invention, together with the appropriate control means, will permit on-line adjustments to the impact point of the deposited powder to yield desired deposit patterns.

Figure 6:
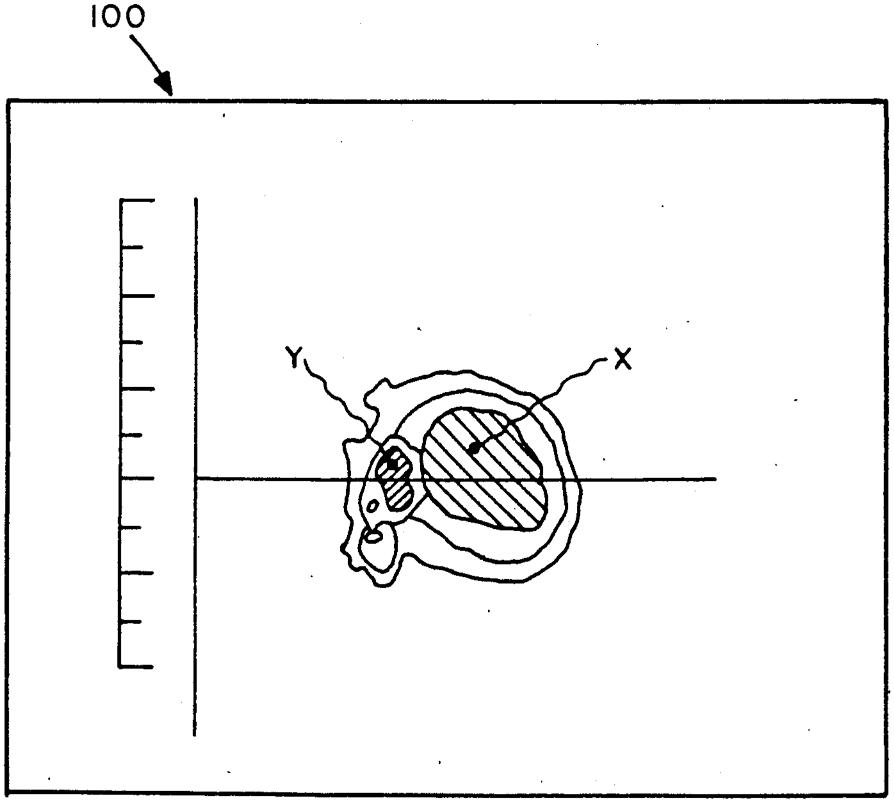
FIG. 6 is a representation of a video display generated by an infrared imaging radiometer employed in a preferred embodiment of the present invention.

FIG. 6 is a representative black and white illustration of a color image 100 which may be obtained using a commercially available infrared imaging system, such as the AGA-780 Dual Thermovision system. It was discovered in tests conducted in connection with the development of the present invention that this camera not only recorded the deposit temperature, but was also capable of providing an image of the deposit pattern such as that shown in FIG. 6. Regions X and Y shown in FIG. 6 are representative of the two highest temperature regions detected on the deposit surface. Region X, at a central region of the image or thermogram 100 corresponds to the plasma jet stagnation point on the target, while Region Y, to the left of center and at a slightly higher temperature than Region X, corresponds to the impact point of the powder spray on the target.

The information contained in this image may be employed by an operator of the apparatus of the present invention, or by control computer 44, to modulate the amount of bypass gas exiting upwardly through bypass gas tube 66 in cyclone separator 26 of FIG. 3. For example, if the sensed or detected impact point is lower than desired, the amount of gas exiting through carrier gas bypass outlet tube 66 can be increased by increasing the opening in bypass control valve 52'. If the sensed impact point is higher than desired, the amount of gas bypassed would be decreased by decreasing the opening n bypass control valve 52'. As discussed previously, this modulation or control of the amount of gas bypassed in cyclone separator 26 may be controlled automatically by control computer 44.

The imaging tests conducted in connection with the development of the present invention also indicated that, assuming filtering means are employed to limit the detection by the imaging system to wavelengths in excess of about 3 micrometers, and especially in the range of about 7–10 micrometers, the detection of background radiation from the plasma jet is substantially eliminated, and the particles entrained in the plasma jet do not appear to obscure the radiometer's view of the target and deposit.

The feed port or injector tube or duct is subject to erosion in the powder injection process, which causes a variation in the injection velocity and thus the trajectory of the powder. The apparatus of the present invention will detect this variation by way of sensing the deposit pattern, and provides means for compensating for the variations due to erosion by controlling the amount of carrier gas to be bypassed. Thus, the need to stop the plasma spray deposition process each time erosion of the feed port causes the deposit pattern to go out of tolerance is substantially avoided, and the process will only have to be stopped when the feed port becomes badly eroded such that the apparatus can no longer compensate for the injection velocity variations.

The foregoing description includes various details and particular features according to a preferred embodiment of the present invention, however, it is to be understood that this is for illustrative purposes only. Various modifications and adaptations may become apparent to those of ordinary skill in the art without departing from the spirit and scope of the present invention. Accordingly, the scope of the present invention is to be determined by reference to the appended claims.

What is claimed is:

1. Apparatus for controlling a powder deposit pattern in a plasma spray process comprising:

means for generating a plasma plume;

means for injecting a powder comprising a plurality of particles into said plasma plume, said powder being entrained in a carrier gas;

target means having a deposit surface facing said plasma plume for receiving thereon a deposit of said powder transported by said plasma plume;

sensor means for generating an image representative of a temperature distribution of said powder deposited on said target means, said sensor means further having means for identifying a location of an impact point of said powder upon said target means; and control means responsive to said sensor means for selectively adjusting a carrier gas flow rate in said powder injecting means to selectively move said location of said powder impact point on said target.

2. Apparatus as defined in claim 1 wherein said sensor means comprises an imaging radiometer adapted to detect infrared radiation emanating from said powder deposited on said target.

3. Apparatus as defined in claim 2 wherein said impact point location identifying means comprises a video signal generating means operatively coupled to said imaging radiometer and video signal processing means for generating signals representative of locations and intensity levels at said locations of said detected infrared radiation.

4. Apparatus as defined in claim 1 wherein said powder injecting means comprises an injector tube disposed to inject said powder into said plasma plume at an orientation substantially normal to an axial extent of said plasma plume.

5. Apparatus as defined in claim 4 wherein said powder injecting means further comprises means for selectively bypassing a desired amount of said carrier gas before said carrier gas and said powder enter said injector tube, and wherein said control means selectively adjusts said amount of bypassed carrier gas to adjust said carrier gas flow rate in said powder injecting means.

6. Apparatus as defined in claim 5 further comprising a powder feed line connected to said powder injecting means, said powder feed line being adapted to transport said powder and said carrier gas to said powder injecting means, and wherein said powder injecting means further comprises a cyclone separator, an input port of said cyclone separator being connected to said powder feed line, and an upper end of said injector tube being connected to a lower end of said cyclone separator.

7. Apparatus as defined in claim 6 wherein said cyclone separator has a carrier gas bypass outlet tube having an opening at an upper end of said cyclone separator adapted to direct said desired amount of bypass carrier gas to exit said cyclone separator through said outlet tube.

8. Apparatus as defined in claim 7 wherein said carrier gas bypass tube is coupled to a carrier gas bypass control valve, said carrier gas bypass control valve being adjustable to a plurality of positions ranging from substantially fully open to substantially fully closed, said carrier gas bypass control valve being employed to regulate the amount of carrier gas bypassed out of said cyclone separator.

9. Apparatus as defined in claim 8 wherein said control means comprises a control computer operatively connected to said sensor means and said carrier bas bypass control valve, wherein said control computer employs said image and said impact point location information generated by said sensor means to selectively open or close said carrier gas bypass control valve to a desired position.

10. Apparatus as defined in claim 4 wherein said sensor means comprises an infrared imaging radiometer disposed in a position to view said target means and said powder deposited thereon.

11. Apparatus as defined in claim 9 wherein said sensor means comprises an infrared imaging radiometer disposed in a position to view said target means and said powder deposited thereon.

12. Apparatus as defined in claim 10 wherein said infrared imaging radiometer is so constructed and arranged to detect only infrared radiation of wavelengths greater than three micrometers.

13. Apparatus as defined in claim 11 wherein said infrared imaging radiometer is so constructed and arranged to detect only infrared radiation of wavelengths greater than three micrometers.

14. Apparatus as defined in claim 9 further comprising means for measuring a powder flow rate and carrier gas flow rate in said powder feed line and means for controlling said powder and carrier gas flow rates in said powder feed line, said measuring means and said controlling means being operatively coupled to said control computer.

15. Apparatus as defined in claim 4 wherein said plurality of particles comprising said powder are in a predetermined range of particle sizes and a length of said injector tube is selected to accelerate a majority of said particles to predetermined respective particle injection velocities.

16. Apparatus for controlling a powder deposit pattern in a plasma spray process comprising:

means for generating a plasma plume having an axial extent;

target means having a deposit surface facing said plasma plume for receiving thereon a deposit of a powder transported by said plasma plume;

means for injecting said powder into said plasma plume, said powder comprising a plurality of particles entrained in a carrier gas, said powder injecting means comprising an injector tube disposed to inject said powder into said plasma plume at an orientation substantially normal to said axial extent of said plume, said powder injecting means further including means for selectively bypassing a desired amount of said carrier gas prior to said carrier gas and said powder entering said injector tube;

sensor means for generating an image representative of a temperature distribution of said powder deposited on said target, said sensor means further having means for identifying a location of an impact point of said powder upon said target means; and control means responsive to said sensor means for selectively adjusting the amount of said carrier gas bypassed before said carrier gas and powder enter said injector tube to selectively move said powder impact point on said target.

17. Apparatus as defined in claim 16 further comprising a powder feed line connected to said powder injecting means, said powder feed line adapted to transport said powder and said carrier gas to said powder injecting means, and wherein said powder injecting means further comprises a cyclone separator, an input port of said cyclone separator being connected to said powder feed line, and an upper end of said injector tube being connected to a lower end of said cyclone separator.

18. Apparatus as defined in claim 17 wherein said cyclone separator has a carrier gas bypass outlet tube having an opening at an upper end of said cyclone separator adapted to direct said desired amount of bypass carrier gas to exit said cyclone separator through said outlet tube.

19. Apparatus as defined in claim 18 wherein said carrier gas bypass tube is coupled to a carrier gas bypass control valve, said carrier gas bypass control valve being adjustable to a plurality of positions ranging from substantially fully open to substantially fully closed, said carrier gas bypass control valve being employed to regulate the amount of carrier gas bypassed out of said cyclone separator.

20. Apparatus as defined in claim 19 wherein said control means comprises a control computer operatively connected to said sensor means and said carrier gas bypass control valve, wherein said control computer employs said image and said impact point location information generated by said sensor means to selectively open or close said carrier gas bypass control valve to a desired position.

21. Apparatus as defined in claim 16 wherein said sensor means comprises an infrared imaging radiometer disposed in a position to view said target means and said powder deposited thereon.

22. Apparatus as defined in claim 20 wherein said sensor means comprises an infrared imaging radiometer disposed in a position to view said target means and said powder deposited thereon.

23. Apparatus as defined in claim 21 wherein said infrared imaging radiometer is so constructed and arranged to detect only infrared radiation of wavelengths greater than three micrometers.

24. Apparatus as defined in claim 22 wherein said infrared imaging radiometer is so constructed and arranged to detect only infrared radiation of wavelengths greater than three micrometers.

25. Apparatus as defined in claim 20 further comprises for measuring a powder flow rate and carrier gas flow rates in said powder feed line and means for controlling said powder and carrier gas flow rates in said powder feed lines, said measuring means and said controlling means being operatively coupled to said control computer.

26. Apparatus as defined in claim 16 wherein said plurality of particles comprising said powder are in a predetermined range of particle sizes and a length of said injector tube is selected to accelerate a majority of said parties to predetermined respective particle injection velocities.

27. A method for controlling a powder deposit pattern in a plasma spray process comprising the steps of:
- generating a plasma plume;
- directing said plasma plume to impinge on a target means;
- injecting, with a powder injecting means, a powder comprising a plurality of particles into said plasma plume to be deposited on said target means, said powder being entrained in a carrier gas;
- generating an image representative of a temperature distribution of said powder deposited on said target means;
- identifying in said image a location of an impact point of said powder upon said target means; and
- selectively adjusting a powder injection velocity by modulating a carrier gas flow rate in said powder injecting means to selectively adjust said location of said impact point of said powder upon said target.

28. A method for controlling a powder deposit pattern in a plasma spray process comprising the steps of:
- generating a plasma plume having an axial extent;
- directing said plasma plume to impinge on a target means;
- injecting a powder through a powder injector tube into said plasma plume at an orientation substantially normal to said axial extent of said plasma plume, said powder comprising a plurality of particles entrained in a carrier gas;
- selectively bypassing a desired amount of said carrier gas prior to said carrier gas and said powder entering said injector tube;
- generating an image representative of a temperature distribution of said powder deposited on said target means;
- identifying in said image a location of an impact point of said powder upon said target means; and
- selectively adjusting, in response to said identified impact point, said amount of said carrier gas bypassed prior to said carrier gas and said powder entering said injector tube to change a powder injection velocity and to selectively adjust said location of said impact point of said powder upon said target.

29. A method as defined in claim 28 comprising the further step of:
- controlling an opening and closing of a carrier gas bypass control valve coupled to a cyclone separator disposed between a powder feed line and said powder injector tube to adjust said amount of said carrier gas bypassed.

30. A method as defined in claim 29 comprising the further step of:
- communicating said image generated and said identified powder impact point to a control computer;
- comparing said image generated and said identified powder impact point to a reference pattern stored in said control computer; and
- selectively sending control signals from said control computer to said carrier gas bypass control valve to control an opening and closing of said control valve in response to said comparison of said image and said identified powder impact point to said reference pattern.

* * * * *